Patented Aug. 29, 1950

2,520,156

UNITED STATES PATENT OFFICE 2,520,156

PROCESS FOR THE MANUFACTURE OF FOLIC ACID

Herbert Lindlar, Basel, and Heinrich Klaeui, Riehen, near Basel, Switzerland, assignors to Hoffmann-La Roche Inc., Nutley, N. J., a corporation of New Jersey No Drawing. Application July 31, 1948, Serial No. 41,896. In Switzerland November 14, 1947

1 Claim. (Cl. 260—251)

The present invention relates to a process for the manufacture of a new pteridine derivative.

According to the present invention a new pteridine derivative may be obtained by condensing 2-amino-4-hydroxy-6-pteridyl-aldehyde with p-amino-benzoyl-1-(+)-glutamic acid in the presence of formic acid at a temperature between 60 and 101° C. The crude condensation product may be isolated from the reaction mixture either by diluting the same with water or ether, or by distilling off the formic acid. A convenient method of working up consists in treating the crude condensation product with magnesium hydroxide in an aqueous suspension, adjusting the resulting solution to pH7, filtering, acidifying the filtrate to a pH of 3-4 and filtering off the precipitate. If desired, the product may be purified further by recrystallisation from water.

The new condensation product which is held to be a formyl derivative of folic acid is a yellow microcrystalline powder which, at temperatures above 250° C., decomposes without melting. The product is easily soluble in formic acid, but difficultly soluble to insoluble in the usual organic solvents. It may be dissolved in acids and alkalis in the form of its salts; by adjusting the pH to 3-4, the product is precipitated from these solutions. The ammonium-, alkali- and alkaline-earth salts are easily soluble, whereas the nickel-, silver-, lead-, zinc-, copper- and mercuric salts are difficultly soluble. The ultra violet spectrum of a solution of the product in 0.01 n-caustic soda shows a maximum at 255 mµ with $$E_{1\ cm.}^{1\%} = 710$$

and at 368 mµ with $$E_{1\ cm.}^{1\%} = 325$$

Growth tests on the streptococcus lactis show both the crude condensation product and the one purified in the manner indicated hereinbefore to possess a biological activity of the same kind and magnitude as an equivalent amount of folic acid. The 2-amino-4-hydroxy-6-pteridyl-aldehyde used as one of the starting materials may be obtained from 2,4,5-triamino-6-hydroxy-pyrimidine in the following manner:

2,4,5-triamino-6-hydroxy-pyrimidine is condensed with a ketohexose in a weakly acid solution in the presence of hydrazine to form 2-amino-4-hydroxy-6-(tetra-hydroxy-butyl)-pteridine. 2-amino-4-hydroxy-6-pteridyl-aldehyde is obtained by treating the resulting compound with an oxidising agent suitable for splitting glycol, such as, for example, potassium periodate or lead-tetra-acetate.

The following examples illustrate how the process of the invention may be carried into effect:

Example 1

10 parts by weight of 2-amino-4-hydroxy-6-pteridyl-aldehyde and 14 parts by weight or p-aminobenzoyl-1-(+)-glutamic acid are heated to 67° C. for 1 hour in 350 parts by volume of formic acid. After cooling down, the filtrated solution is added to 4000 parts by volume of ether while stirring, whereupon the precipitate is filtered, pressed, washed with water and alcohol and dried at 50° C. This product may be purified by recrystallising several times from water. More conveniently it may be purified by treating the pulverised product with 10 parts by weight of magnesium hydroxide in 8000 parts by volume of cold water (or 4000 parts by volume of water of 70° C.); after neutralisation and filtration the pH is set to between 3 and 4 whereupon 14 parts by weight of condensation product are precipitated from the solution. The results of the micro biological determination correspond to those obtained from a solution containing an equimolecular solution of purest synthetic folic acid obtainable.

Example 2

10 parts by weight of 2-amino-4-hydroxy-6-pteridyl-aldehyde and 14 parts by weight of p-aminobenzoyl-1-(+)-glutamic acid are heated for 1 hour to 67° C. in 350 parts by volume of formic acid. The solution is treated with 1000 parts by volume of water, filtered and concentrated in vacuo to 300 parts by volume. By diluting with water and adjusting the pH to 3.5 precipitation of the condensation product is completed. The precipitate is treated in the ball mill for 20 hours with 10 parts by weight of magnesium hydroxide in 8000 parts by volume of water and filtered. The resulting solution is neutralised, filtered, its pH adjusted to between 3 and 4, whereupon the precipitated condensation product is isolated, yielding 6.05 parts by weight.

We claim:

A process which comprises condensing 2-amino-4-hydroxy-6-pteridyl-aldehyde with p-aminobenzoyl-1-(+)-glutamic acid in formic acid at a temperature between about 60° C. and about 101° C. so as to produce N-formyl folic acid.

HERBERT LINDLAR.
HEINRICH KLAEUI.

REFERENCES CITED

The following references are of record in the file of this patent:

UNITED STATES PATENTS

| Number | Name | Date |
|---|---|---|
| 2,422,836 | Angier | June 8, 1948 |

OTHER REFERENCES

Degering et al., An Outline of Organic Nitrogen Compounds, p. 203 (1945 edition).

Angier et al., Science 103, 667–669 (1946).